(12) United States Patent
Duenkel et al.

(10) Patent No.: US 10,855,018 B2
(45) Date of Patent: Dec. 1, 2020

(54) TOUCH-PROOF CONTACT ARRANGEMENT

(71) Applicant: TE Connectivity Germany GmbH, Bensheim (DE)

(72) Inventors: Dirk Duenkel, Bensheim (DE); Eike Luellich, Mannheim (DE)

(73) Assignee: TE Connectivity Germany GmbH, Bensheim (NO)

( * ) Notice: Subject to any disclaimer, the term of this patent is extended or adjusted under 35 U.S.C. 154(b) by 0 days.

(21) Appl. No.: 16/502,366

(22) Filed: Jul. 3, 2019

(65) Prior Publication Data
US 2020/0014140 A1    Jan. 9, 2020

(30) Foreign Application Priority Data
Jul. 4, 2018 (DE) .......................... 10 2018 211 043

(51) Int. Cl.
*H01R 13/44* (2006.01)
*B60L 50/50* (2019.01)
*H01M 2/30* (2006.01)

(52) U.S. Cl.
CPC .............. *H01R 13/44* (2013.01); *B60L 50/50* (2019.02); *H01M 2/30* (2013.01)

(58) Field of Classification Search
CPC ................................ H01R 13/44; B60L 50/50
USPC ......................................................... 439/135
See application file for complete search history.

(56) References Cited

U.S. PATENT DOCUMENTS

| | | | | |
|---|---|---|---|---|
| 2,537,370 A * | 1/1951 | Parnes | ................... | H01R 13/44 439/693 |
| 3,123,424 A * | 3/1964 | Williams | ............... | H01R 13/44 439/693 |
| 3,781,913 A * | 12/1973 | Liburdi | .................. | H01R 13/60 439/134 |
| 4,012,103 A * | 3/1977 | Lunguist | .............. | A61N 1/3752 439/181 |
| 4,105,273 A * | 8/1978 | Henschke | .............. | H01R 13/44 439/290 |
| 5,391,972 A * | 2/1995 | Gardner | .............. | H01M 2/1055 320/115 |
| 6,146,211 A * | 11/2000 | Okamoto | ............... | H01R 13/04 439/181 |
| 6,309,256 B1 * | 10/2001 | Hosono | ................ | H01R 13/405 439/692 |

(Continued)

FOREIGN PATENT DOCUMENTS

DE    10 2012 105 839 A1    2/2014
DE    10 2013 209 690 A1    11/2014
(Continued)

OTHER PUBLICATIONS

German Office Action, Appl. No. 10 2018 211 043.3, dated Mar. 29, 2019, 8 pages.

(Continued)

*Primary Examiner* — Alexander Gilman
(74) *Attorney, Agent, or Firm* — Barley Snyder

(57) ABSTRACT

A touch-proof contact arrangement includes a pin contact having a pair of sides and a free end and a contact protection formed of an electrically insulating material and covering the sides and the free end of the pin contact. The contact protection has a pair of legs and a connecting section connecting the legs. The sides of the pin contact are received in a pair of lateral recesses of the legs of the contact protection.

19 Claims, 3 Drawing Sheets

(56) References Cited

U.S. PATENT DOCUMENTS

| | | | | |
|---|---|---|---|---|
| D480,362 | S * | 10/2003 | Yu | D13/156 |
| 7,955,097 | B2 | 6/2011 | O'Leary et al. | |
| 8,298,022 | B2 * | 10/2012 | Tsuruta | H01R 13/03 439/886 |
| 8,961,202 | B2 * | 2/2015 | Busson, Jr. | H01R 13/44 439/131 |
| 9,647,372 | B2 | 5/2017 | Eckel | |
| 2011/0104916 | A1 * | 5/2011 | O'Leary | H01R 13/447 439/121 |
| 2013/0090012 | A1 * | 4/2013 | Natter | H01R 13/04 439/625 |
| 2016/0064849 | A1 * | 3/2016 | Eckel | H01R 24/66 439/135 |

FOREIGN PATENT DOCUMENTS

| | | | |
|---|---|---|---|
| DE | 10 2015 107 304 A1 | 11/2016 | |
| EP | 2683036 A1 | 1/2014 | |
| JP | S58-147180 U | 10/1983 | |
| JP | 2001-266 986 A | 9/2001 | |
| WO | 9524061 A1 | 9/1995 | |
| WO | 2014187908 A1 | 11/2014 | |

OTHER PUBLICATIONS

Machine-generated Abstract of DE102015107304, dated Nov. 17, 2016, 1 page.
Abstract of JP2001266986, dated Sep. 28, 2001, 1 page.
Abstract of corresponding document EP2683036 (related to DE102012105839), dated Jan. 8, 2014, 2 pages.
Extended European Search Report, European Patent Application No. 19183706.1, dated Oct. 18, 2019, 11 pages.
Abstract of EP 2683036 A1, dated Jan. 8, 2014, 1 page.

* cited by examiner

TOUCH-PROOF CONTACT ARRANGEMENT

CROSS-REFERENCE TO RELATED APPLICATION

This application claims the benefit of the filing date under 35 U.S.C. § 119(a)-(d) of German Patent Application No. 102018211043.3, filed on Jul. 4, 2018.

FIELD OF THE INVENTION

The present invention relates to an electrical plug connector and, more particularly, to a touch-proof contact arrangement for an electrical plug connector.

BACKGROUND

Contact arrangements have pin contact elements for an electrical plug connector, in particular a high-current and/or high-voltage plug connector which, for example, links an electrical system of an automobile to its battery or accumulator. In electric or hybrid vehicles driven fully or in part by electrical current, very large currents and/or voltages are transmitted via the plug elements and the plug contacts installed therein.

Due to the high currents and/or voltages, particularly high safety requirements are placed on the plug connectors. It is therefore stipulated, for example, that the contact elements must be protected from being touched by a human finger. A standardized test finger is provided for a corresponding test, this test finger being intended to simulate a human fingertip and being pressed with a stipulated testing force against sections or apertures of the plug connector, via which the pin contacts are accessible, without the test finger being permitted to come into contact with current-carrying sections of the pin contacts. Therefore, electrical pin contacts are equipped with a contact protection which prevents direct accessing of the current-carrying sections of the pin contacts with a finger.

The contact protection of the electrical pin contacts in the prior art, however, does not create a particularly robust finger protection. In known touch-proof contact arrangements, a form-fit between a pin contact and a contact protection of the contact arrangement is formed at a connecting section of the contact protection. A free end of the pin contact tapers to an acute angle so that the free end can dip deeply into a recess of the connecting section and form a stronger form-fit between the pin contact and the contact protection. However, a gap between a contact surface of the pin contact and the recess is large, and the mating contact is abraded during plugging and/or unplugging. As a result, the number of possible plugging cycles is reduced and the wear of the plug connector and of the mating contact is greater.

SUMMARY

A touch-proof contact arrangement includes a pin contact having a pair of sides and a free end and a contact protection formed of an electrically insulating material and covering the sides and the free end of the pin contact. The contact protection has a pair of legs and a connecting section connecting the legs. The sides of the pin contact are received in a pair of lateral recesses of the legs of the contact protection.

BRIEF DESCRIPTION OF THE DRAWINGS

The invention will now be described by way of example with reference to the accompanying Figures, of which.

DETAILED DESCRIPTION OF THE EMBODIMENT(S)

The invention is described in greater detail hereinafter by way of example using exemplary embodiments with reference to the attached figures. In the figures, elements which correspond to one another in design and/or function are provided with the same reference symbols. The combination of features shown and described with the individual exemplary embodiments is solely for the purpose of explanation. It is possible to dispense with a feature from an exemplary embodiment if the technical effect thereof is of no importance in a particular application. Conversely, a further feature can be added in an exemplary embodiment if the technical effect thereof is meant to be advantageous or necessary for a particular application.

Figure 1:
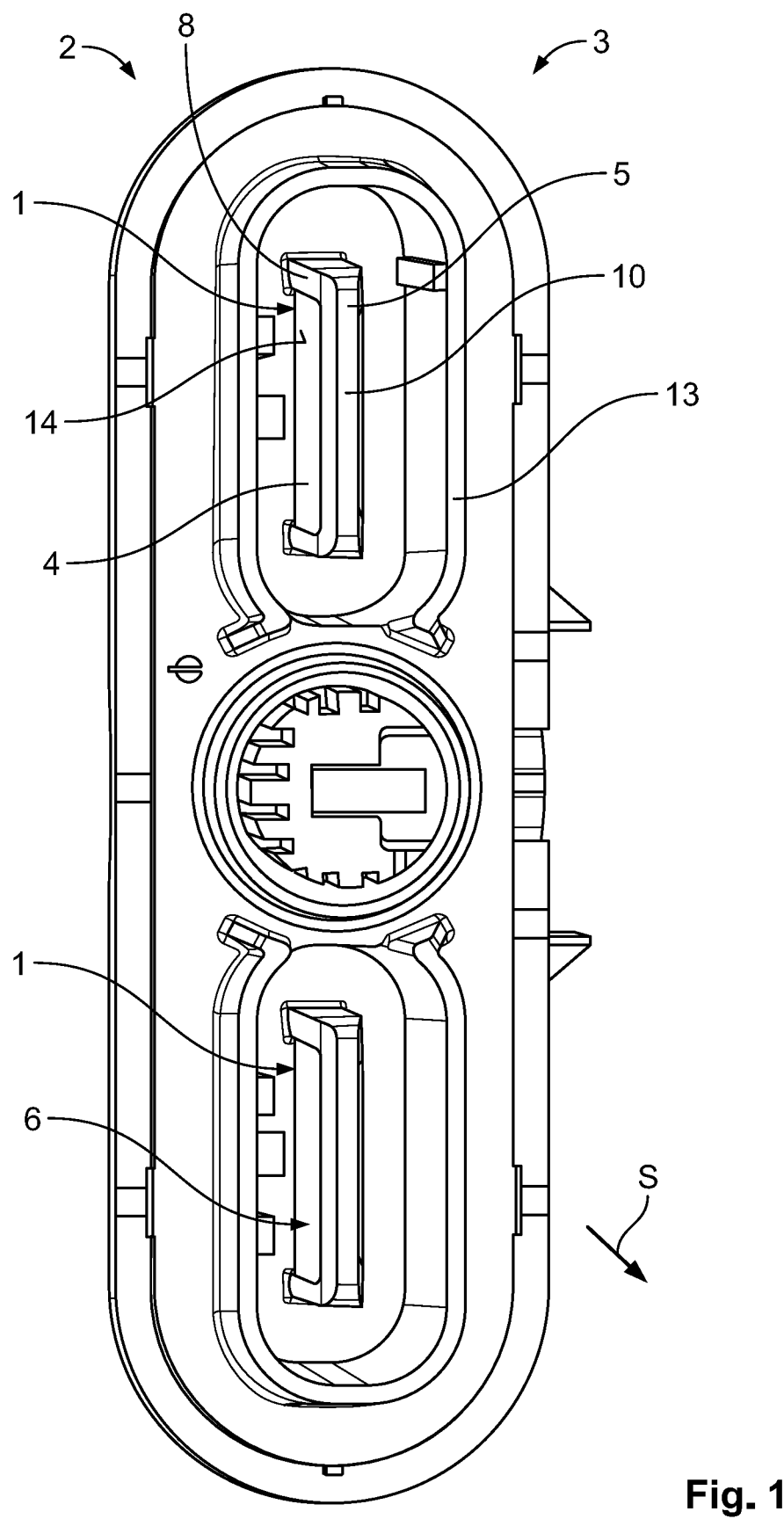
FIG. 1 is a perspective view of a plug connector according to an embodiment.

A plug connector 2 equipped with a touch-proof contact arrangement 1 according to an embodiment is shown in FIG. 1. The plug connector 2 has a housing 3 configured as a pin tray. In the shown embodiment, the plug connector 2 is equipped with two contact arrangements 1 arranged next to one another. Each touch-proof contact arrangement 1 has a pin contact 4 formed as a so-called flat contact and a contact protection 5. In an embodiment, the plug connector 2 is for a high-current and/or high-voltage plug.

The contact protection 5 is formed in a single piece with the housing 3 as a monolithic component, for example by injection molding. In various embodiments, the contact protection 5 is molded, cast or otherwise shaped onto the pin contact 4. In another embodiment, the contact protection 5 and the pin contact 4 are releasably connected to each other, for example, by a catching device of the contact protection 5 engaging in a catching aperture of the pin contact 4. In the shown embodiment, the contact protection 5 is formed substantially in a U-shape, with two legs 8 connected to one another by a connecting section 10. In another embodiment, the contact protection 5 can be constructed modularly from separate parts; the legs 8 can be removable from the connecting section 10.

The housing 3, as shown in FIG. 1, is equipped with slot openings 6 through which the pin contacts 4 can be pushed in in a plug-in direction S. The legs 8 are connected to the housing 3 at ends of the legs 8 which face away from the connecting section 10. The legs 8 delimit the slot opening 6 to the side, such that, when the pin contact 4 is plugged in, a free end 11 and sides 12 of the pin contact 4 which extend from the free end 11 up to the slot opening 6, as shown in FIGS. 2 and 3, are covered by the contact protection 5.

The housing 3, as shown in FIG. 1, has a collar 13 surrounding each contact arrangement 1. The collar 13 is made of an electrically insulating material and protrudes beyond the contact arrangement 1, preventing a human finger from touching electrically conductive contact surfaces 14 of the pin contact 4, which are delimited by the slot opening 6, the free end 11, and the sides 12.

The touch-proof contact arrangement 1, as shown in FIGS. 2-5, extends in a longitudinal direction X, a transverse direction Y, and a vertical direction Z, which jointly span a Cartesian coordinate system. In the vertical direction Z, the touch-proof contact arrangement 1 can be plugged together with a mating contact (not shown) in a plug-in direction S.

Figure 2:
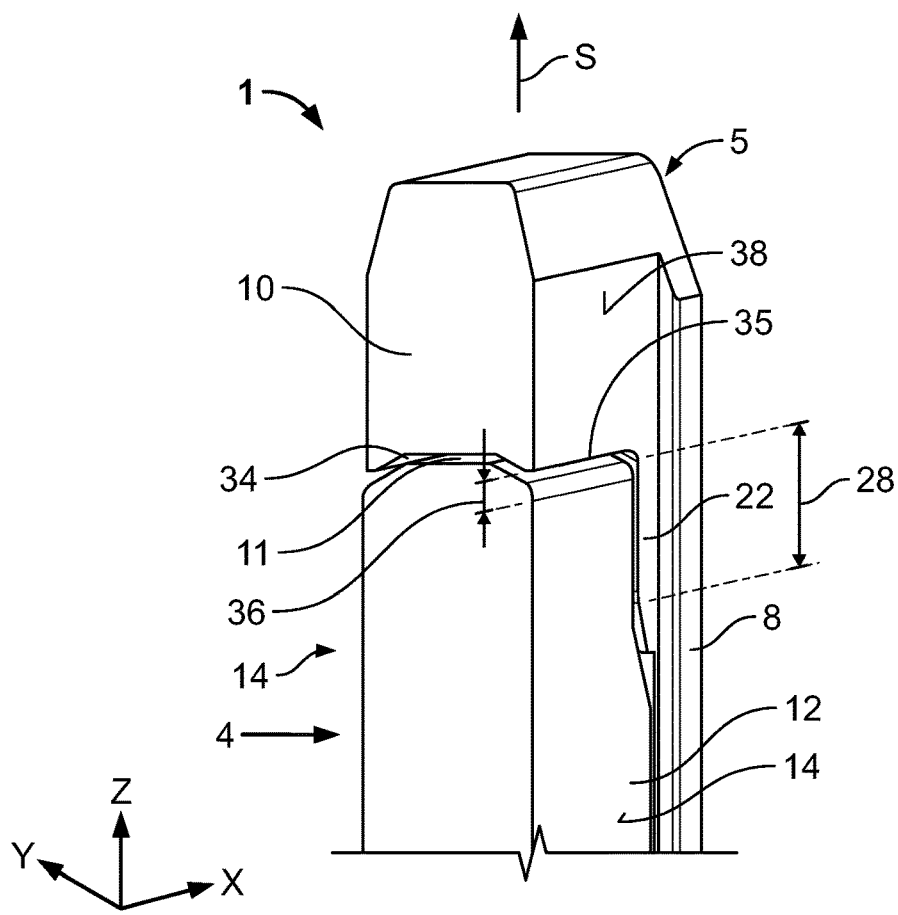
FIG. 2 is a sectional side perspective view of a touch-proof contact arrangement according to an embodiment.
Figure 3:
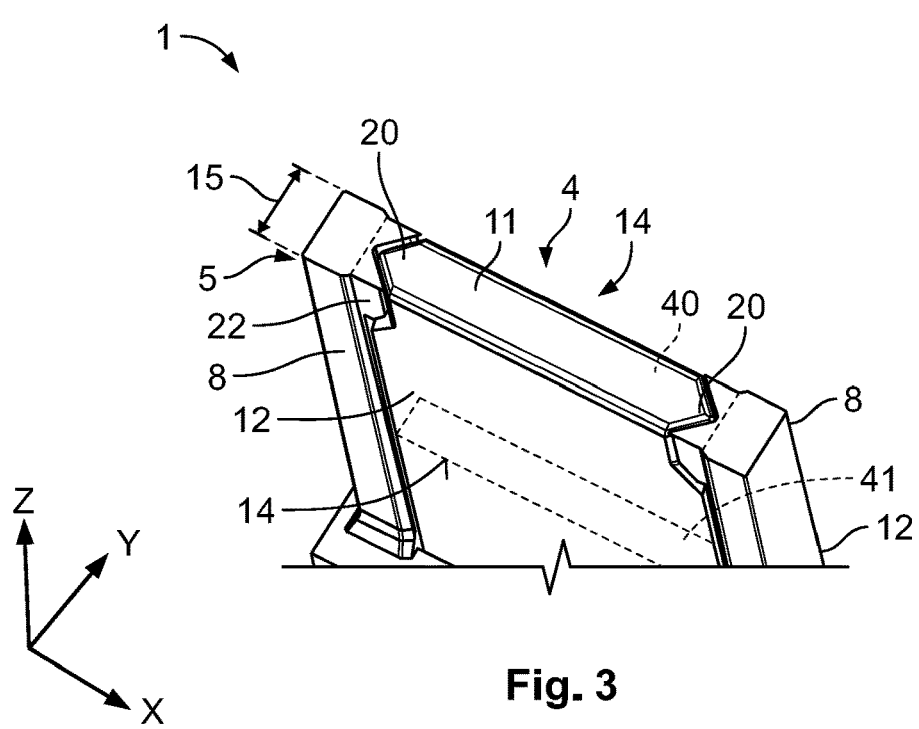
FIG. 3 is a sectional top perspective view of the touch-proof contact arrangement.

The contact arrangement 1, as shown in FIGS. 2 and 3, has the electrically insulating contact protection 5 and the pin contact 4 in the form of a flat contact. The flat contact can be inserted in two different plug-in directions, with angled (90°) and straight (180°) plug connectors 2. At its sides 12 which delimit the pin contact 4 in the longitudinal direction X and at its free end 11 situated in the vertical direction Z, the pin contact 4 is covered by the contact protection 5. The sides 12 of the pin contact 4 are each covered by one leg 8. The free end 11 is covered by the connecting section 10 which connects the legs 8.

Figure 5:
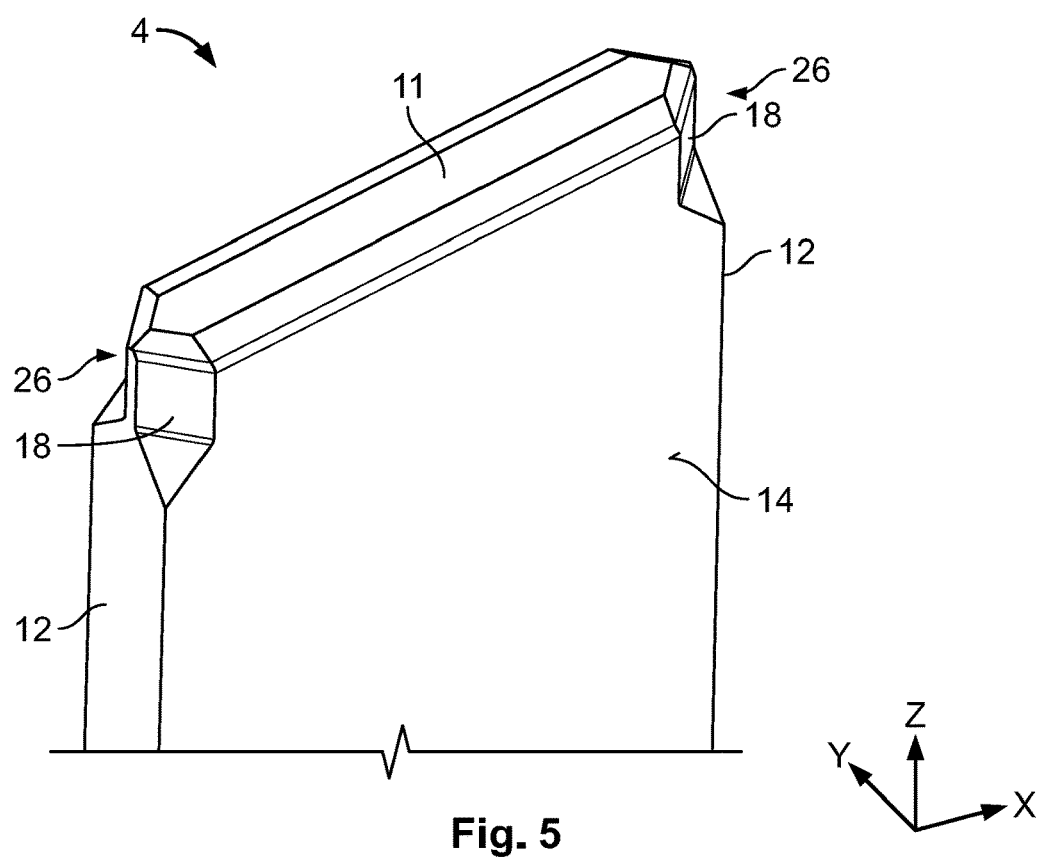
FIG. 5 is a perspective view of a pin contact of the touch-proof contact arrangement.

The pin contact 4, as shown in FIGS. 2, 3, and 5, is equipped with contact surfaces 14 which are arranged parallel to one another and which extend between the sides 12 along the vertical direction Z and longitudinal direction X. The contact surfaces 14 can be contacted by a mating contact which is compatible with the pin contact 4. The sides 12 of the pin contact 4 can be arranged facing each other and parallel to one another. As a result, the pin contact 4 has a symmetrical design, and in an embodiment, has a rectangular shape.

The contact protection 5 prevents a person from being able to unintentionally touch the electrically conductive contact points of the pin contact 4 with his/her finger. In order to prevent the contact protection 5 from no longer covering the sides 12 when force is applied to the contact protection 5 and/or the pin contact 4, the legs 8 have a wall thickness 15 transverse to the contact surface 14, shown in FIG. 3, which is greater than the width of the pin contact 4 in the transverse direction Y.

It is necessary for the contact arrangement 1 to have a high degree of mechanical stiffness, so that an elastic deformation of the contact arrangement 1 is prevented if, for example, a bending force bears on the contact protection 5 and exerts a bending force on the contact arrangement 1. For this purpose, the sides 12, in their corners 18 formed by the free end 11 and the respective sides 12, are received in and/or pushed into lateral recesses 20 of the contact protection 2, as shown in FIGS. 2-5.

Figure 4:
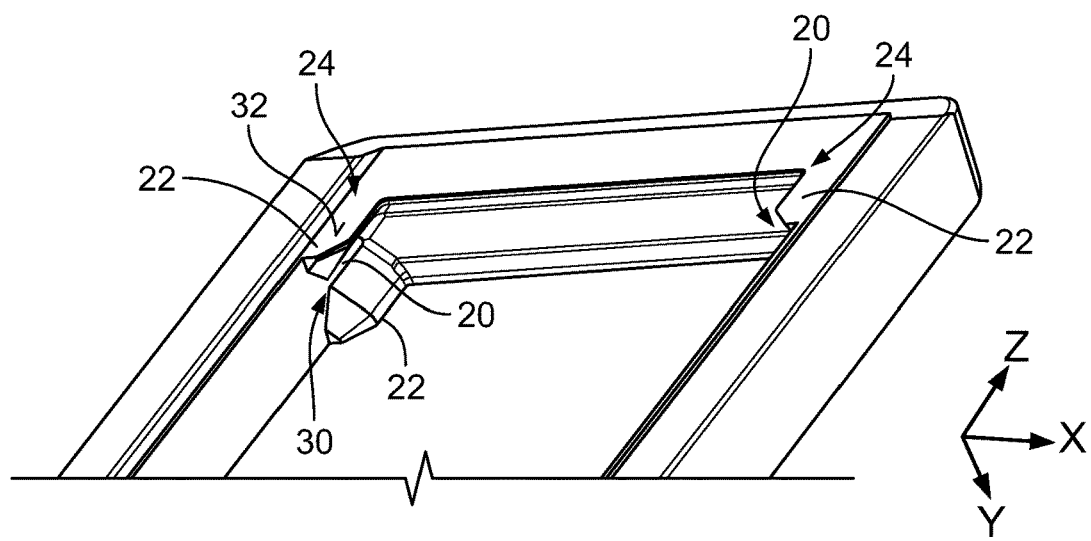
FIG. 4 is a perspective view of a contact protection of the touch-proof contact arrangement.

The lateral recesses 20, as shown in FIGS. 2-4, are formed by side walls 22 which protrude in the direction of the opposing leg 8 and which delimit the lateral recesses 20 in the transverse direction Y. The side walls 22 can be connected to the legs 8 rigidly or can be monolithically formed in a single piece with the legs 8. The side walls 22 are arranged in corners 24 formed by the connecting section 10 and the respective leg 8. The lateral recesses 20 have the shape of a substantially V-shaped groove, which is formed in a substantially complementary manner relative to a cavity 26 at the sides 12 of the pin contact 4, shown in FIG. 5. In various embodiments, the cavities 26 can be created by reshaping, milling, or the like.

Through the lateral recesses 20, there arises, with a compactly arranged touch-proof contact arrangement 1, a high overlap 28 between the contact protection 5 and the pin contact 4. The overlap 28 allows a high degree of stiffness can be achieved in the touch-proof contact arrangement 1. The overlap 28 is sufficiently large that the contact protection 5 withstands a test force of at least 30 N and thus fulfils the stipulations of a testing standard of a motor vehicle high-voltage contacting, for example LV-215, with tightened requirements. The contact arrangement 1 therefore has a form-fit in the direction transverse to the contact surface 14 between the pin contact 4 and the contact protection 5 in the form of a tongue-and-groove joint, in which the resilient devices are formed by the cavity 26 at the sides 12 of the pin contact 4 and the groove of the lateral recess 20 of the contact protection 5. The stiffness of the touch-proof contact arrangement 1 avoids elastic deformations, for example, if a test finger is resting on the contact protection 5 and exerts a bending force.

The pin contact 4 can be pushed in plug-in direction S shown in FIG. 2 into the contact protection 5, which has substantially a U-shaped cross-section. The cavities 26 are pushed into and received in the respective lateral recesses 20. To guide and orient the pin contact 4 during pushing-in, the lateral recesses 20 widen gradually in the longitudinal direction X at the end facing away from the connecting section 10. In the guide 30 created as a result, as shown in FIG. 4, the cavity 26 can be centered while being pushed-in the plug-in direction S and incorrect plugging is avoided.

The side walls 22 cover the pin contact 4 in the region of the cavities 26 transverse to the contact surface 14, wherein outer surfaces 32 of the side wall 22 facing away from the lateral recesses 20 are aligned with the contact surface 14, as shown in FIGS. 2-4. In an embodiment, the outer surfaces 32 can be arranged flush with the contact surfaces 14. As a result, the mating contact is prevented from encountering resistance at an edge of the side walls 22, which runs transverse to the plug-in direction S, during plugging and/or unplugging and from being damaged as a result. An inner width between the outer surfaces 32 is smaller than the wall thickness 15 of the legs 8 in a direction transverse to the contact surface 14.

The free end 11 of the pin contact 4, as shown in FIGS. 2 and 3, is arched in a convex manner and is received in a substantially complementary concave recess 34, which extends along the connecting section 10 between sides of the legs 8 which face one another. The convexly arched free end 11 is formed by an obtuse bevel 38, which opens in a planar front side 40 situated in a plane spanned by the longitudinal direction X and transverse direction Y. The arching can run parallel to side surfaces of the sides 12 of the pin contact 4. The convex arching can be generated by a taper running at an obtuse angle.

Because the pin contact 4 is received in the lateral recesses 20, and this already guarantees the necessary stiffness of the contact arrangement 1, it is no longer necessary to have to push the free end 11 into the connecting section 10. Therefore, the pin contact 4 can ideally be pushed into the recess 34 of the connecting section 10 snugly, or at least with a small spacing of less than 0.4 mm, in particular less than 0.2 mm, between the free end 11 and the wall of the recess 34. As shown in FIG. 2, an edge 35 at the transition between the contact surface 14 and the connecting section 10 is thus prevented from protruding in the transverse direction 4 from the contact surface 14 on which the mating contact rubs during plugging and/or unplugging. In this embodiment, a gap 36 between the contact surface 14 and the recess 34 is negligibly small in the transverse direction Y at the transition in plug-in direction S from the pin contact 4 to the connecting section 10, so that the mating contact is not damaged.

The free end 11 in the case of the touch-proof contact arrangement 1 according to the invention need not greatly overlap with the connecting section 10. Because the overlap between the contact protection 5 and the pin contact 4 is not too large, during plugging-together with the mating contact, the mating plug does not bear too greatly on the contact protection 5 and sufficiently contacts the contact surface 14 of the pin contact 4. The free end 11 and the recess 34 can therefore be smaller in size in the vertical direction Z. The outer surfaces 32 of the side walls 22 are arranged flush with the respective outer surfaces 36 of the connecting section 10 facing away from the recess 34 in the transverse direction Y, and are aligned with the contact surfaces 14. As a result, no protruding edge comes into being at the transition between the pin contact 4 and the contact protection 5 at which a mating contact can rub during plugging and/or unplugging.

The side walls 22 complete a cross-section of the pin contact 4 to make a total cross-section 40, shown in FIG. 3, which corresponds in shape and size to the total cross-section 41 of the pin contact 4 in a region which is situated deeper in the vertical direction Z, and in which the pin contact 4 is arranged between the legs 8 but the sides 12 are not arranged in a lateral recess 20.

Through the touch-proof contact arrangement 1 according to the invention, it is thus possible to create a plug connector with a robust touch-proof contact arrangement 1, in which large bending forces can be withstood and wear of the contact arrangement 1 and of the mating plug can be avoided.

What is claimed is:

1. A touch-proof contact arrangement for a plug connector, comprising:
   a pin contact having a pair of sides and a free end; and
   a contact protection formed of an electrically insulating material and covering the sides and the free end of the pin contact, the contact protection having a pair of legs and a connecting section connecting the legs, the sides of the pin contact are received in a pair of lateral recesses of the legs of the contact protection, an inner width of each of the lateral recesses increases in a direction away from the connecting section.

2. The touch-proof contact arrangement of claim 1, wherein the free end of the contact pin is arched in a convex manner and is received in a concave recess of the connecting section.

3. The touch-proof contact arrangement of claim 1, wherein the pin contact and the contact protection have a form-fit in a direction transverse to a contact surface of the pin contact.

4. The touch-proof contact arrangement of claim 3, wherein the contact surface extends between the sides of the pin contact.

5. The touch-proof contact arrangement of claim 1, wherein the pin contact has a pair of cavities complementary to the lateral recesses.

6. The touch-proof contact arrangement of claim 5, wherein the pair of cavities each become shallower in a direction away from the free end.

7. The touch-proof contact arrangement of claim 5, wherein at least one of the cavities is disposed in a corner of the pin contact formed by the free end and one of the sides of the pin contact.

8. The touch-proof contact arrangement of claim 1, wherein at least one of the lateral recesses is disposed between a pair of side walls of one of the legs.

9. The touch-proof contact arrangement of claim 8, wherein the side walls protrude from the one of the legs in a direction of another leg of the pair of legs.

10. The touch-proof contact arrangement of claim 9, wherein the side walls are arranged in a corner formed by the connecting section and the one of the legs.

11. The touch-proof contact arrangement of claim 10, wherein the side walls only extend along part of the one of the legs in the direction away from the connecting section.

12. The touch-proof contact arrangement of claim 9, wherein an outer surface of each of the side walls facing away from the lateral recess is aligned with a contact surface of the pin contact.

13. The touch-proof contact arrangement of claim 9, wherein the side walls are substantially flush with the connecting section.

14. The touch-proof contact arrangement of claim 12, wherein an inner width between the outer surfaces of the side walls is smaller than a wall thickness of the legs in a direction transverse to the contact surface.

15. The touch-proof contact arrangement of claim 9, wherein the side walls complete a cross-section of the pin contact to make a total cross-section that corresponds in a shape and a size with a total cross-section of the pin contact in a region further from the connecting section.

16. The touch-proof contact arrangement of claim 12, wherein the side walls cover a portion of the contact surface.

17. A plug connector, comprising:
    a touch-proof contact arrangement including a pin contact having a pair of sides and a free end and a contact protection formed of an electrically insulating material and covering the sides and the free end of the pin contact, the contact protection having a pair of legs and a connecting section connecting the legs, the sides of the pin contact are received in a pair of lateral recesses of the legs of the contact protection, an inner width of each of the lateral recesses increases in a direction away from the connecting section.

18. The plug connector of claim 17, wherein the plug connector is for a high-current and/or a high-voltage plug.

19. The plug connector of claim 17, further comprising a housing monolithically formed in a single piece with the contact protection.

* * * * *